US012451087B2

(12) United States Patent
Lin et al.

(10) Patent No.: US 12,451,087 B2
(45) **Date of Patent: *Oct. 21, 2025**

(54) LIGHT MODULE DRIVING METHOD FOR ILLUMINATION DEVICE

(71) Applicant: Radiant Opto-Electronics Corporation, Kaohsiung (TW)

(72) Inventors: Jon-Hong Lin, Kaohsiung (TW); Peng-Hsiang Wu, Kaohsiung (TW); Chun-Yi Sun, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 2 days.

This patent is subject to a terminal disclaimer.

(21) Appl. No.: 18/367,505

(22) Filed: Sep. 13, 2023

(65) Prior Publication Data

US 2024/0005884 A1 Jan. 4, 2024

Related U.S. Application Data

(63) Continuation of application No. 17/947,174, filed on Sep. 19, 2022, now Pat. No. 11,798,503, which is a continuation of application No. PCT/CN2021/110979, filed on Aug. 5, 2021.

(51) Int. Cl.

| | |
|---|---|
| ***G09G 3/34*** | (2006.01) |
| ***G09G 3/20*** | (2006.01) |
| ***G09G 3/36*** | (2006.01) |

(52) U.S. Cl.

CPC ......... *G09G 3/3406* (2013.01); *G09G 3/2096* (2013.01); *G09G 3/3611* (2013.01); *G09G 2320/0233* (2013.01)

(58) Field of Classification Search

CPC .. G09G 3/3406; G09G 3/2096; G09G 3/3611; G09G 2320/0233

See application file for complete search history.

(56) References Cited

U.S. PATENT DOCUMENTS

| | | | | |
|---|---|---|---|---|
| 7,045,974 | B2 * | 5/2006 | Lin | H05B 45/22 315/308 |
| 8,289,477 | B2 * | 10/2012 | Kobayashi | G09G 3/3426 349/64 |
| 2006/0038509 | A1 | 2/2006 | Lin | |
| 2010/0052564 | A1 * | 3/2010 | Park | H05B 41/2822 315/291 |
| 2018/0374412 | A1 * | 12/2018 | Kaneko | G09F 9/30 |

(Continued)

FOREIGN PATENT DOCUMENTS

| | | |
|---|---|---|
| JP | 2012-182112 | 9/2012 |
| KR | 10-2020-0059481 | 5/2020 |
| WO | 2009/110456 | 9/2009 |

*Primary Examiner* — Kwang-Su Yang

(74) *Attorney, Agent, or Firm* — Winston Hsu

(57) ABSTRACT

A light module driving method for an illumination device, wherein the light module driving method includes an outputting operation of outputting a light driving signal according to a source; a transforming operation of transforming the light driving signal into a plurality of modulated light driving signals according to a compensation and calibration unit; and a driving operation of driving a plurality of lighting zones corresponding to a light-emitting diode (LED) module of the light module according to the plurality of modulated light driving signals.

22 Claims, 9 Drawing Sheets

(56) References Cited

U.S. PATENT DOCUMENTS

| | | | | |
|---|---|---|---|---|
| 2020/0090600 | A1* | 3/2020 | Calayir | G09G 3/3611 |
| 2020/0160791 | A1* | 5/2020 | Chung | G09G 3/3275 |
| 2021/0151004 | A1* | 5/2021 | Kobayashi | H04N 9/30 |

* cited by examiner

LIGHT MODULE DRIVING METHOD FOR ILLUMINATION DEVICE

CROSS REFERENCE TO RELATED APPLICATIONS

This application is a continuation application of U.S. application Ser. No. 17/947,174, filed on Sep. 19, 2022, which is a continuation application of PCT Application No. PCT/CN2021/110979, filed on Aug. 5, 2021. The contents of these applications are incorporated herein by reference.

BACKGROUND OF THE INVENTION

1. Field of the Invention

The present invention relates to a light module driving method, and more particularly, to a light module driving method, capable of adjusting non-uniform characteristics of light-emitting diodes.

2. Description of the Prior Art

Liquid-crystal displays (LCD) are widely utilized in electronic products, e.g. televisions, computer devices and mobile phones. The conventional LCD usually includes a LCD panel, a control IC module, a driving IC module and a backlight module, wherein the control IC module is utilized for transforming or processing image data, the driving IC module is utilized for outputting corresponding voltage signals to the LCD panel, and the backlight module is usually implemented by a light board consisted of a plurality of light-emitting diodes (LED) and utilized as a light source of the LCD panel for displaying.

In order to save power consumption of the LCD and increase an image contrast of the LCD, the conventional LCD usually adopts local dimming technique to turn on different backlight sources corresponding to different display zones on the LCD panel of the LCD with different brightness according to image data. For example, if a display zone of the image data on the LCD is with brighter brightness and another display zone of the image data on the LCD is with darker brightness, the local dimming technique controls the LEDs corresponding to the display zone to display with brighter backlight brightness and controls the LEDs corresponding to the another display zone to display with darker backlight brightness. Therefore, the local dimming technique may save power consumption compared to general operations of turning on all backlight sources with maximal backlight brightness.

In addition to the LCD technique, the local dimming technique may be applied in general illumination devices, which controls different lighting zones with different lighting without additionally implementing multiple illumination devices of different types or functions to light up different lighting zones.

In general, the conventional local dimming technique is based on an assumption: an output current of each lighting zone of the lighting aboard is identical, and the brightness of each lighting zone is the same with the identical current flowing by. However, since differences of manufacturing process, hardware element or circuit layout of the driving IC module exist practically, the current on the lighting board is affected, and causes phenomenon of non-uniform brightness of each lighting zone with identical current. Under such a situation, the brightness of each lighting zone is hard to be displayed as expected after the local dimming. Therefore, improvements are necessary to the prior art.

SUMMARY OF THE INVENTION

In light of this, the present invention provides a light module driving method to improve a non-uniform characteristics of lighting zones in brightness with an identical current flowing by.

An embodiment of the present invention discloses a light module driving method for an illumination device, wherein the light module driving method comprises an outputting operation of outputting a light driving signal according to a source; a transforming operation of transforming the light driving signal into a plurality of modulated light driving signals according to a compensation and calibration unit; and a driving operation of driving a plurality of lighting zones corresponding to a light-emitting diode (LED) module of the light module according to the plurality of modulated light driving signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
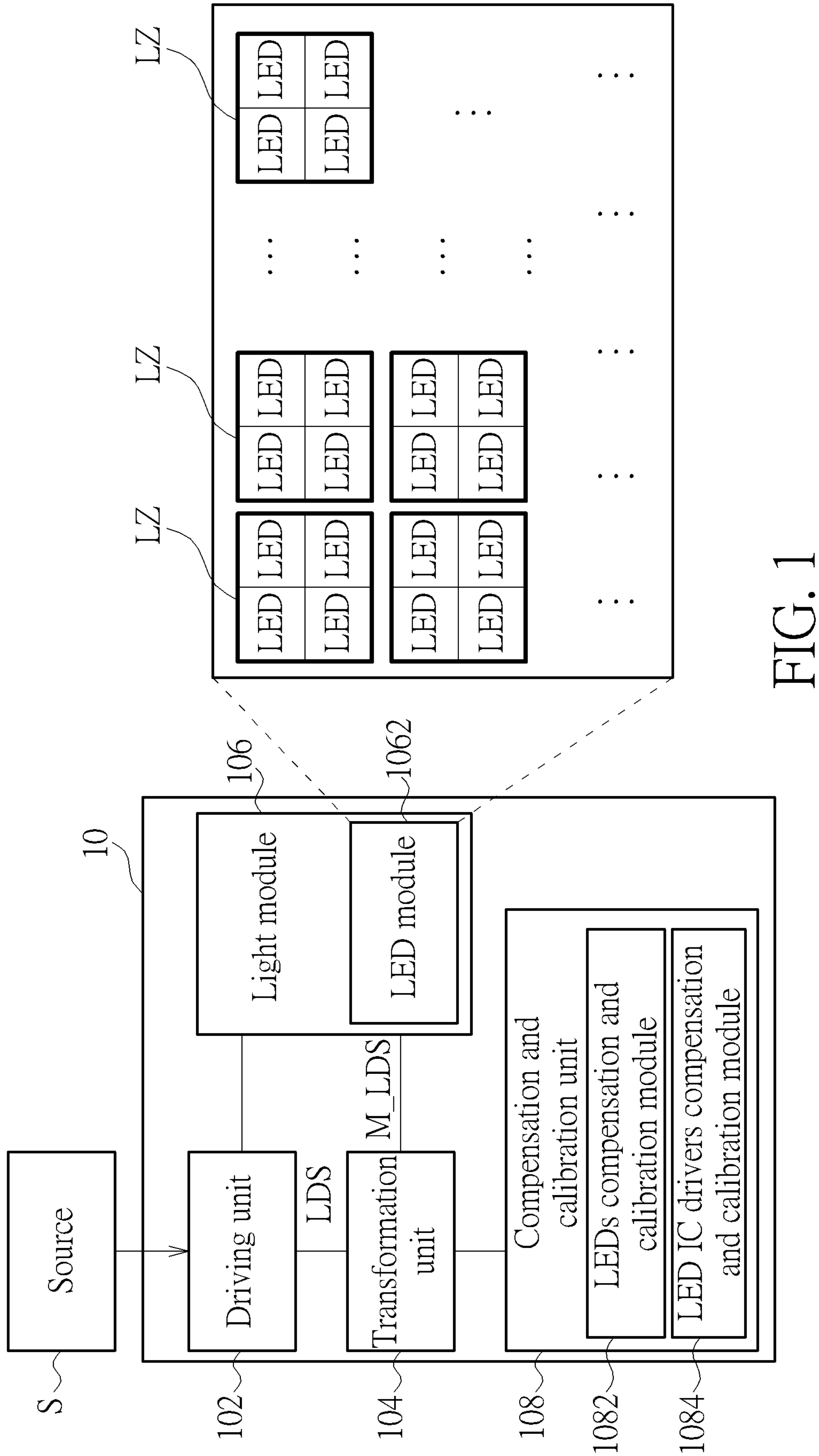
FIG. 1 is a schematic diagram of an illumination device according to an embodiment of the present invention.

Please refer to FIG. 1, which is a schematic diagram of an illumination device 10 according to an embodiment of the present invention. The illumination device 10 includes a driving unit 102, a transformation unit 104, a light module 106 and a compensation and calibration unit 108. The illumination device 10 may be a lighting device, the driving unit 102 is configured to output a light driving signal LDS according to a source S, and the source S may be a physical power switch or a software on/off signal for turning on/off the lighting device. The light module 106 may include a light-emitting diode (LED) module 1062, which includes a plurality of lighting zones LZ, wherein each of the lighting zones LZ may correspond to multiple LEDs. In this example, each lighting zone LZ corresponds to four LEDs. The light driving signal LDS is configured to drive the plurality of lighting zones LZ corresponding to the LED module 1062 of the light module 106. The transformation unit 104 is coupled to the driving unit 102 and the light module 106. The compensation and calibration unit 108 is coupled to the transformation unit 104. The transformation unit 104 is configured to transform the light driving signal LDS into multiple modulated light driving signals M_LDS according to the compensation and calibration unit 108 to drive each lighting zone LZ corresponding to the LED module 1062, wherein the compensation and calibration unit 108 may adjust the light driving signal LDS for driving the LED module 1062 according to optics, circuits and element characteristics of the LED to generate the modulated light driving signals M_LDS. Therefore, the output current of each lighting zone is slightly different due to the calibration measurement of the compensation and calibration unit 108, i.e. the modulated light driving signal M_LDS is different to the light driving signal LDS, such that a uniform brightness characteristic of each lighting zone can be achieved, and the illumination device 10 according to an embodiment of the present invention may improve the issue of non-uniform characteristics in the brightness of each lighting zone, when identical current flowing through the lighting zones.

Figure 2:
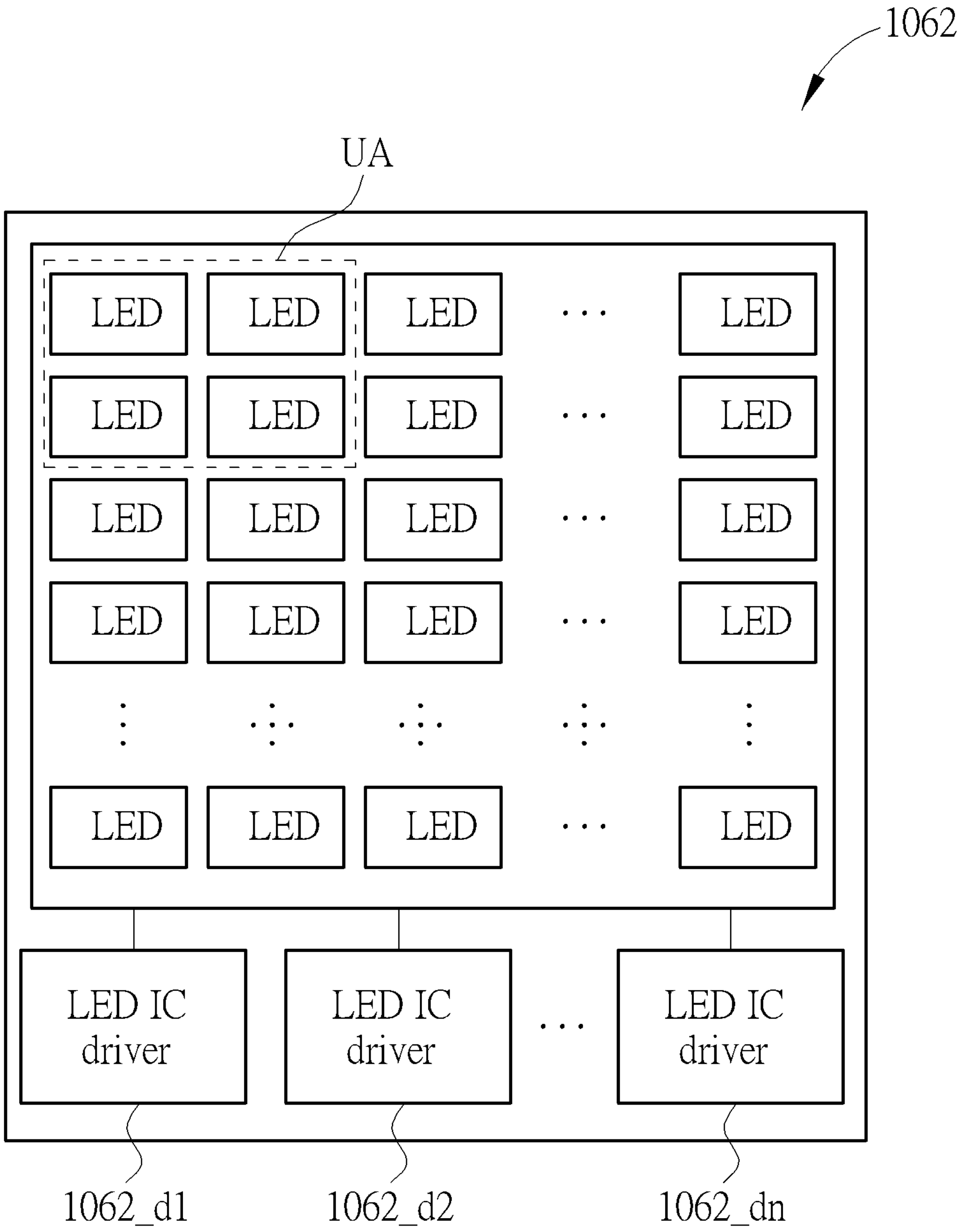
FIG. 2 is a schematic diagram of a light-emitting diode (LED) module of the illumination device in FIG. 1 according to another embodiment of the present invention.

In detail, please refer to FIG. 2, which is a schematic diagram of the LED module 1062 according to another embodiment of the present invention. The LED module 1062 includes multiple LEDs, and a number of the LEDs in a unit area UA is more than a number of the lighting zones. For example, assume that four LEDs correspond to a lighting zone, then one lighting zone corresponds to one unit area UA, and the lighting zone corresponds to four LEDs. Notably, the number of LED corresponding to the above each unit area UA is not limited to four.

In addition, the compensation and calibration unit 108 according to an embodiment of the present invention may include a LEDs compensation and calibration module 1082 configured to store lighting adjustment information of non-uniform characteristics of the LEDs of the LED module 1062, such that the transformation unit 104 may transform the light driving signal LDS into the modulated light driving signals M_LDS according to the LEDs compensation and calibration module 1082 of the compensation and calibration unit 108, and to drive the LED module 1062 with the modulated light driving signal M_LDS.

In the prior art, the local dimming technique is based on an assumption condition that an output current of each lighting zone is identical, and a brightness of each lighting zone is identical with identical current flowing by. However, specifically, since differences of manufacturing process, hardware element or circuit layout of each LED of the LED module 1062 exist, a drift of characteristics of each LED is generated. Therefore, the brightness of each LED would be different when each LED of the LED module 1062 is driven by identical current, which affects a brightness uniformity of the light module 106. In an embodiment, the transformation unit 104 according to an embodiment of the present invention may adjust a current value of the LED according to the LEDs compensation and calibration module 1082. The output current of each lighting zone would be slightly different due to corresponding calibration of the LEDs compensation and calibration module 1082, and the brightness uniformity may be achieved to avoid phenomenon of non-uniform brightness of the lighting zones. In this way, the local dimming technique may be adopted into the LED module 1062 to ensure that each lighting zone after the light adjustment can achieve expected zone brightness.

In another embodiment, as shown in FIG. 2, the LED module 106 may further include a plurality of LED IC drivers 1062_*d*1-1062_*dn* for driving the LEDs corresponding to the lighting zone. In such a situation, since differences of manufacturing process, hardware element or circuit layout of the LED IC drivers 1062_*d*1-1062_*dn* exist, a drift of characteristics of each of LED IC drivers 1062_*d*1-1062_*dn* is generated. Therefore, in addition to the non-uniform characteristics in brightness of each LED, the brightness uniformity of each lighting zone would be affected by the non-uniform characteristics of each LED IC drivers 1062_*d*1-1062_*dn*. The compensation and calibration unit 108 of the illumination device 10 according to an embodiment of the present invention may further include a LED IC drivers compensation and calibration module 1084 for storing the driving adjustment information of the non-uniform characteristics of the LED IC drivers 1062_*d*1-1062_*dn* of the LED module 1062. In this way, the transformation unit 104 according to an embodiment of the present invention may adjust the current values of the LED IC drivers 1062_*d*1-1062_*dn* according to the LED IC drivers compensation and calibration module 1084 to avoid the non-uniform characteristics of the lighting zones in brightness. In the embodiment, the transformation unit is configured to simultaneously incorporate with the LEDs compensation and calibration module and the LED IC drivers compensation and calibration module to transform the light driving signal into the plurality of modulated light driving signals. However, the phrase of "simultaneously incorporate" is not limited thereto.

In the embodiment, the transformation unit 104 may be a micro controller unit (MCU), and the compensation and calibration unit 108 may be memory and store the lighting adjustment information of non-uniform characteristics of the LED into the LEDs compensation and calibration module 1082 and store the driving adjustment information of non-uniform characteristics of the LED IC drivers 1062_*d*1-1062_*dn* into the LED IC drivers compensation and calibration module 1084. However, the proposed present invention is not limited thereto, e.g. the compensation and calibration unit 108 may be a processor, which utilizes the LEDs compensation and calibration module 1082 to determine the calculation of approximate conversion function to obtain the lighting adjustment information of non-uniform characteristics of the LED, and utilizes the LED IC drivers compensation and calibration module 1084 to determine the calculation of approximate conversion function to obtain the driving adjustment information of non-uniform characteristics of the LED IC drivers 1062_*d*1-1062_*dn*. The approximate conversion function may be a linear function, non-linear function or polynomial function, e.g. a cubic function. Furthermore, in other embodiment, the compensation and calibration unit 108 may be embedded in the transformation unit 104, which utilizes a central processing unit (CPU) of the transformation unit 104 for performing the calculations of the approximate conversion function, without any additional processor to be the compensation and calibration unit 108, and reducing implementation costs.

Figure 3:
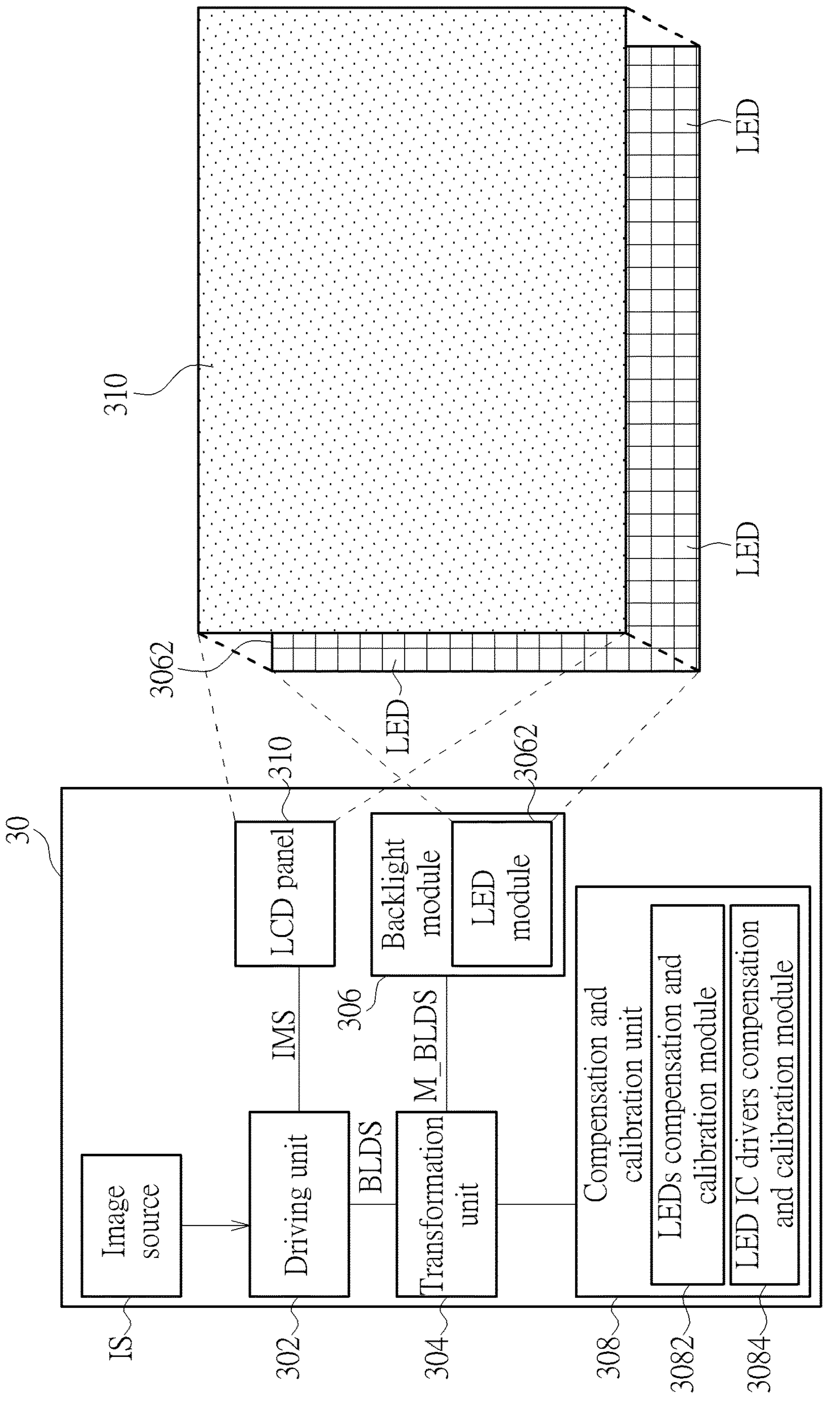
FIG. 3, FIG. 3A and FIG. 3B are schematic diagrams of a display device according to an embodiment of the present invention.

In another embodiment, please refer to FIG. 3, which is a schematic diagram of a display device 30 according to an embodiment of the present invention. The display device 30 may be a display, which includes a driving unit 302, a transformation unit 304, a backlight module 306, a compensation and calibration unit 308 and a liquid-crystal display (LCD) panel 310. The driving unit 302 is coupled to the LCD panel 310, for outputting an image signal IMS and a backlight driving signal BLDS according to an image source IS, wherein the image source IS is generated by the display device 30 rather than inputting from the external, therefore, the display device 30 is an standalone display, e.g. liquid-crystal display products of mobile phones, tablets, laptops, automotive displays.

The image signal IMS is utilized for driving the LCD panel 310 to generate corresponding images. The backlight module 306 includes an LED module 3062, and the LED module 3062 may include a plurality of lighting zones corresponding to a display zone of the LCD panel 310. That is, a number of a plurality of lighting zones in a unit area is more than a number of a plurality of display zones. The backlight driving signal BLDS outputted by the driving unit 302 may be utilized for driving the lighting zones corresponding to the LED module 3062 of the backlight module 306. The transformation unit 304 is coupled to the driving unit 302 and the backlight module 306, and the compensation and calibration unit 308 is coupled to the transformation unit 304. The transformation unit 304 is configured to transform the backlight driving signal BLDS into multiple modulated backlight driving signals M_BLDS according to the compensation and calibration unit 308 to drive each lighting zone corresponding to the LED module 3062, wherein the compensation and calibration unit 308 may adjust the backlight driving signal BLDS for driving the LED module 1062 to generate the multiple modulated backlight driving signals M_BLDS according to optics, circuits and element characteristics of the display device 30. Therefore, since the output current of the lighting zone corresponding to each display zone is slightly different due to corresponding calibration of the compensation and calibration unit 308, i.e. the modulated backlight driving signal M_BLDS is different to the backlight driving signal BLDS), the brightness uniformity characteristics of each display zone may be achieved, the display device 30 according to an embodiment of the present invention may improve the issue of the non-uniform characteristics of conventional display zone in brightness.

Figure 3A:
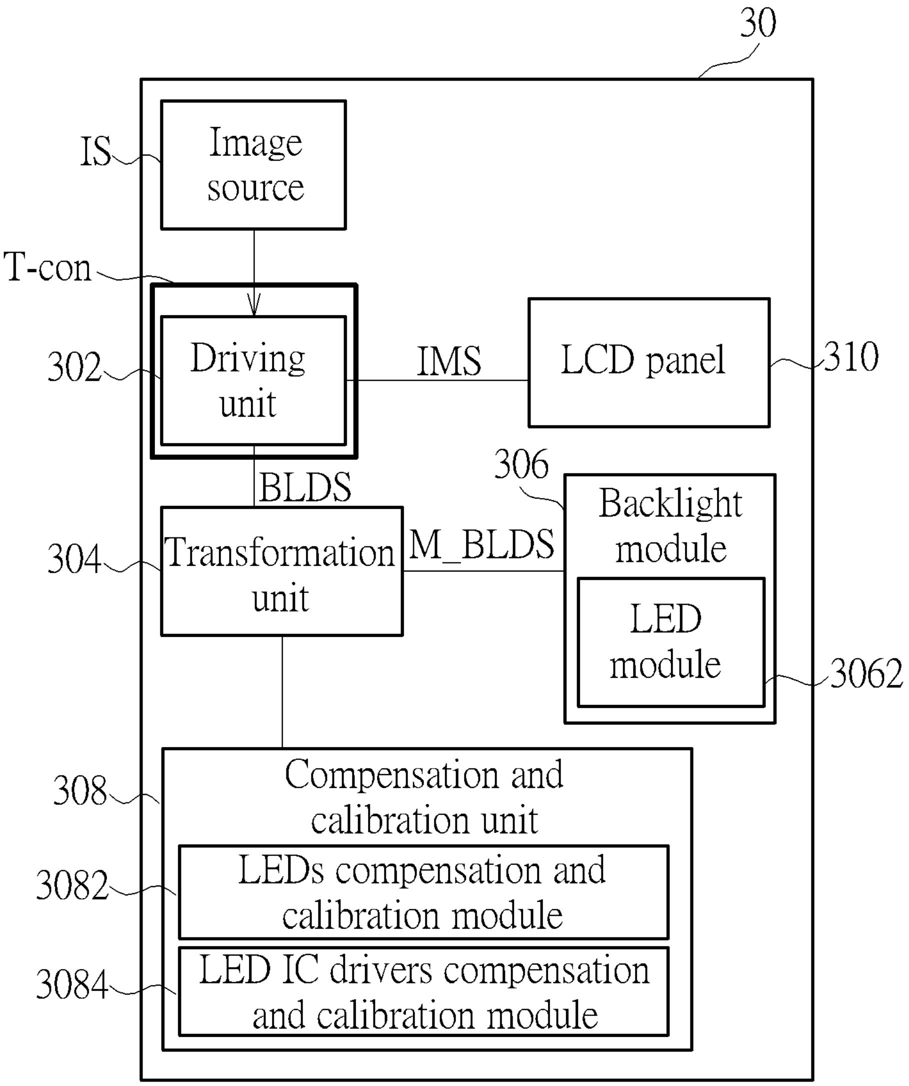
Figure 3B:
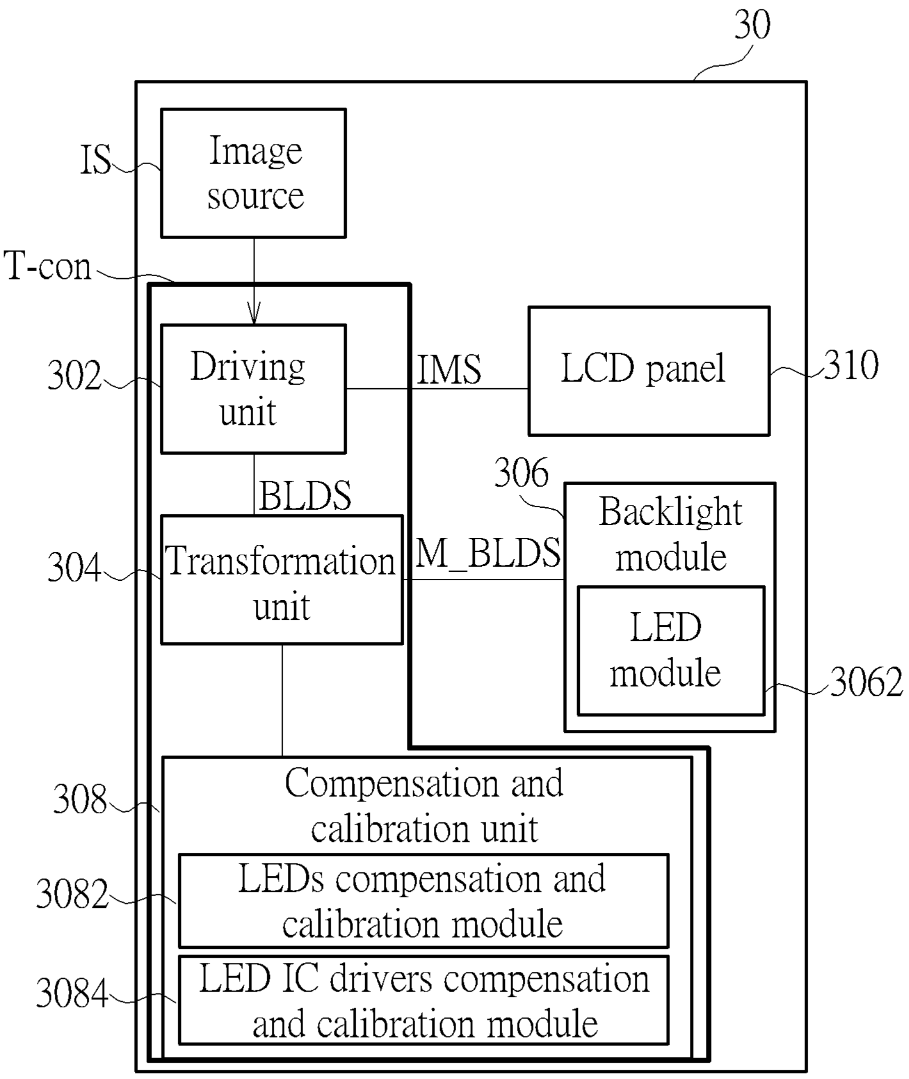

In an embodiment, as shown in FIG. 3A, the display device 30 may include a timing controller T-con, and the timing controller T-con may include the driving unit 302. The transformation unit 304 and the compensation and calibration unit 308 are independent of the timing controller T-con. In this way, the transformation unit 304 and the compensation and calibration unit 308 may be applied in the timing controller T-con applied in different products and reduces development costs. Alternatively, as shown in FIG. 3B, the timing controller T-con of the display device 30 may further include the driving unit 302, the transformation unit 304 and the compensation and calibration unit 308. That is, the transformation unit 304 and the compensation and calibration unit 308 are embedded in the timing controller T-con as an integrated IC module, such that the production costs may be reduced when in mass production with economies of scale.

In addition, the compensation and calibration unit 308 according to an embodiment of the present invention may further include a LEDs compensation and calibration module 3082 for storing the lighting adjustment information of non-uniform characteristics of the LED of the LED module 3062, such that the transformation unit 304 transforms the backlight driving signal BLDS into the multiple modulated backlight driving signals M_BLDS according to the LEDs compensation and calibration module 3082 of the compensation and calibration unit 308, and drives the LED module 3062 with the multiple modulated backlight driving signals M_BLDS.

More specifically, since differences of manufacturing process, hardware element or circuit layout of each LED of the LED module 3062 exist, a drift of characteristics of each LED is generated, the brightness of each LED would be different when each LED of the LED module 3062 is driven by identical current, which affects the brightness uniformity of the light module 306. In an embodiment, the transformation unit 304 according to an embodiment of the present invention may adjust a current value of each LED according to the LEDs compensation and calibration module 3082 to avoid the phenomenon of non-uniform brightness of the lighting zones.

Figure 4:
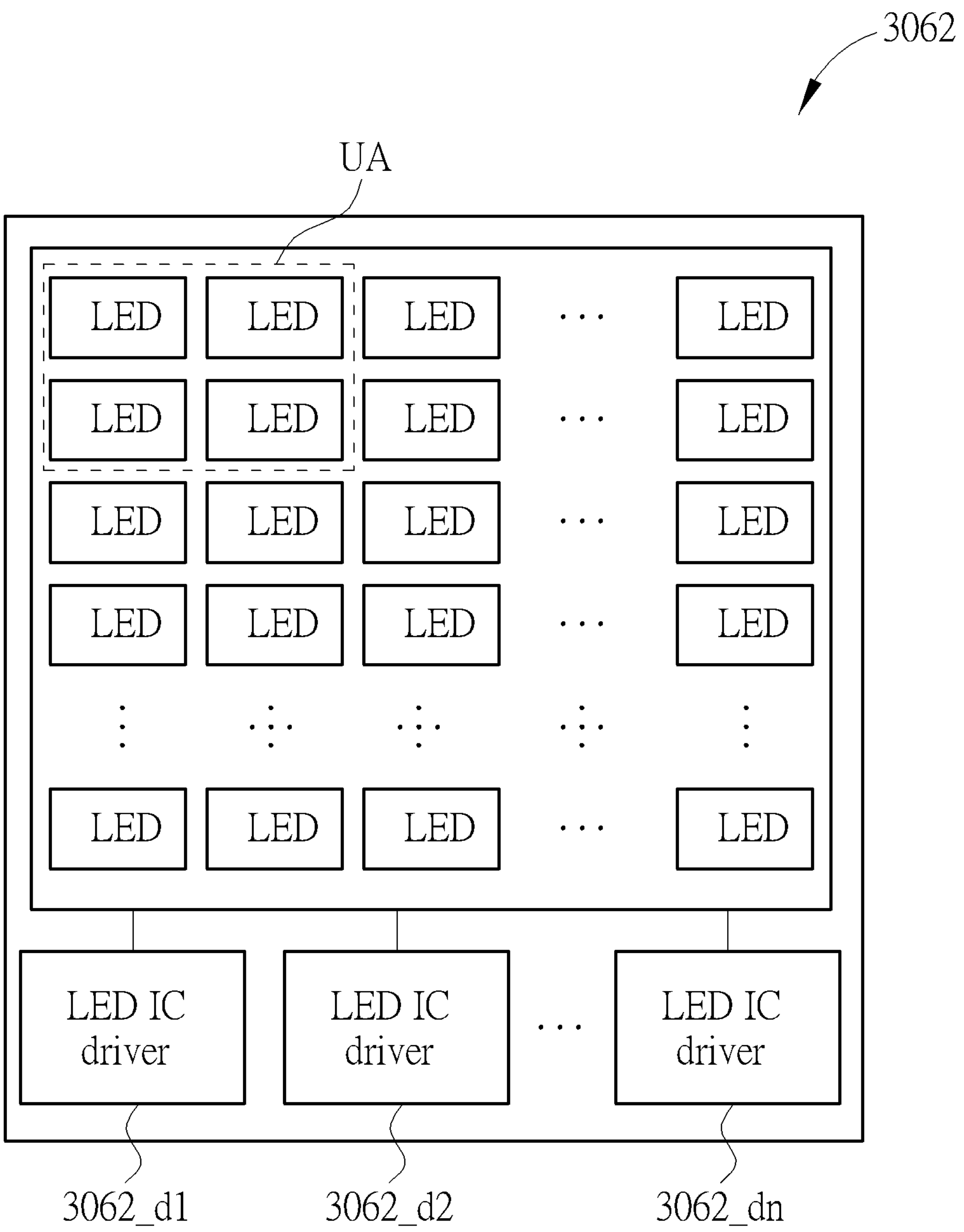
FIG. 4 is a schematic diagram of an LED module of the display device in FIG. 3 according to an embodiment of the present invention.

Moreover, as shown in FIG. 4, the LED module 3062 may further include a plurality of LED IC drivers 3062_*d*1-3062_*dn* for driving corresponding LEDs within the lighting zone. In such a situation, since differences of manufacturing process, hardware element or circuit layout of the LED IC drivers 3062_*d*1-3062_*dn* exist, a drift of characteristics is generated. Therefore, the compensation and calibration unit 308 of the illumination device 10 may further include a LED IC drivers compensation and calibration module 3084 for storing the driving adjustment information of non-uniform characteristics of the LED IC drivers 3062_*d*1-3062_*dn* of the LED module 3062. In this way, the transformation unit 304 according to an embodiment of the present invention may adjust the current values of the LED IC drivers 3062_*d*1-3062_*dn* according to the LED IC drivers compensation and calibration module 3084 to avoid the phenomenon of non-uniform brightness of the lighting zones.

Figure 5:
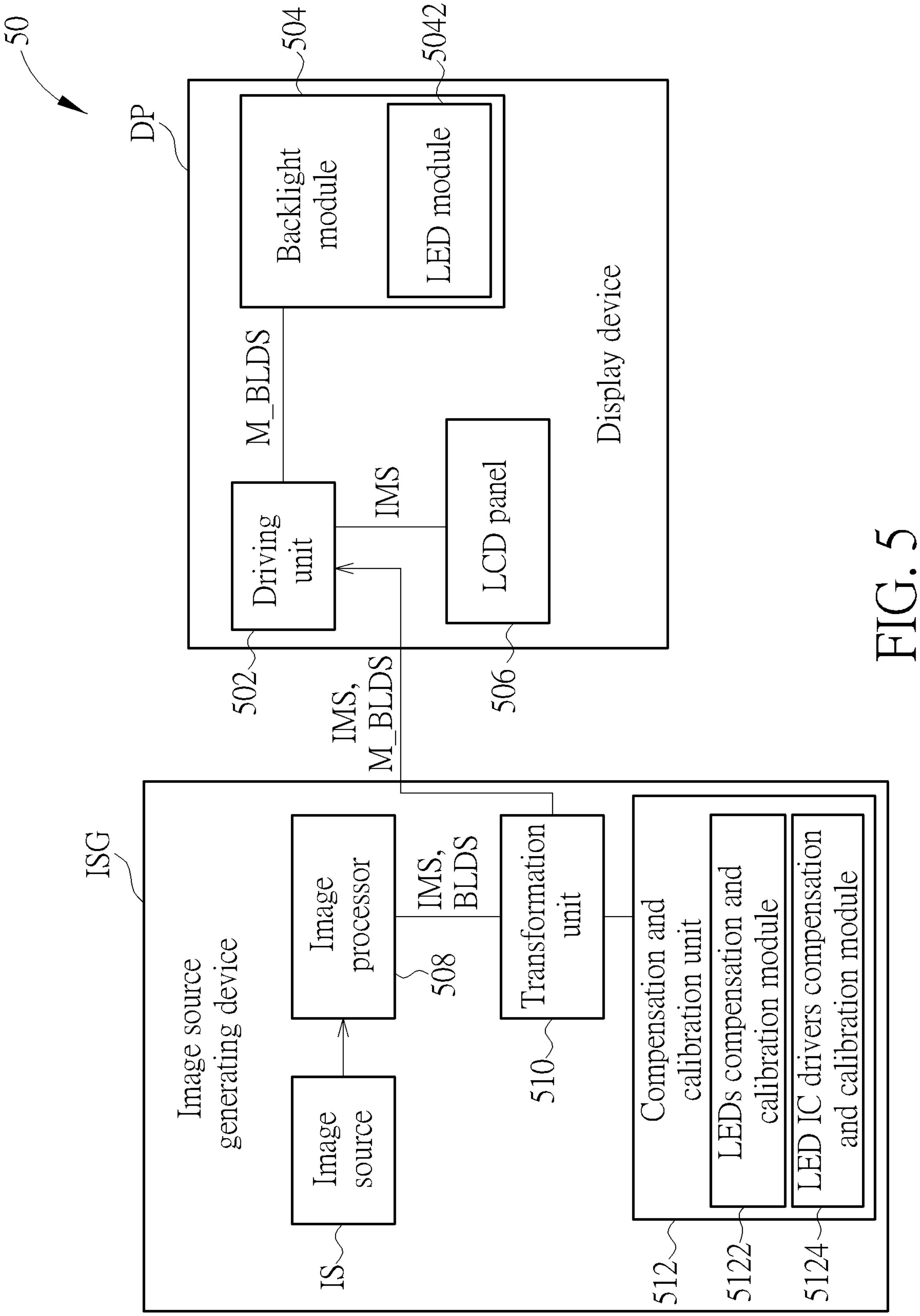
FIG. 5 and FIG. 5A are schematic diagrams of a display system according to an embodiment of the present invention.

In another embodiment, please refer to FIG. 5, which is a schematic diagram of a display system 50 according to an embodiment of the present invention. The display system 50 includes a display device DP and an image source generating device ISG. The display device DP may be a liquid-crystal display (LCD), which includes a driving unit 502, a backlight module 504 and a liquid-crystal display (LCD) panel 506. The image source generating device ISG includes an image processor 508, a transformation unit 510 and a compensation and calibration unit 512, e.g. the image source generating device ISG may be implemented on a host terminal or a device with processing functions, which is different to the compensation and calibration unit 308 of the display device 30 in FIG. 3, wherein the compensation and calibration unit 308 is implemented in the display device 30. Therefore, the image source is inputted from the external of the display device DP, i.e. the image source is generated by the image source generating device ISG and inputted to the display device DP. The display device DP is a connection-type display device, which usually refers to liquid-crystal display products of computer monitors, televisions with external connectors.

Figure 5A:
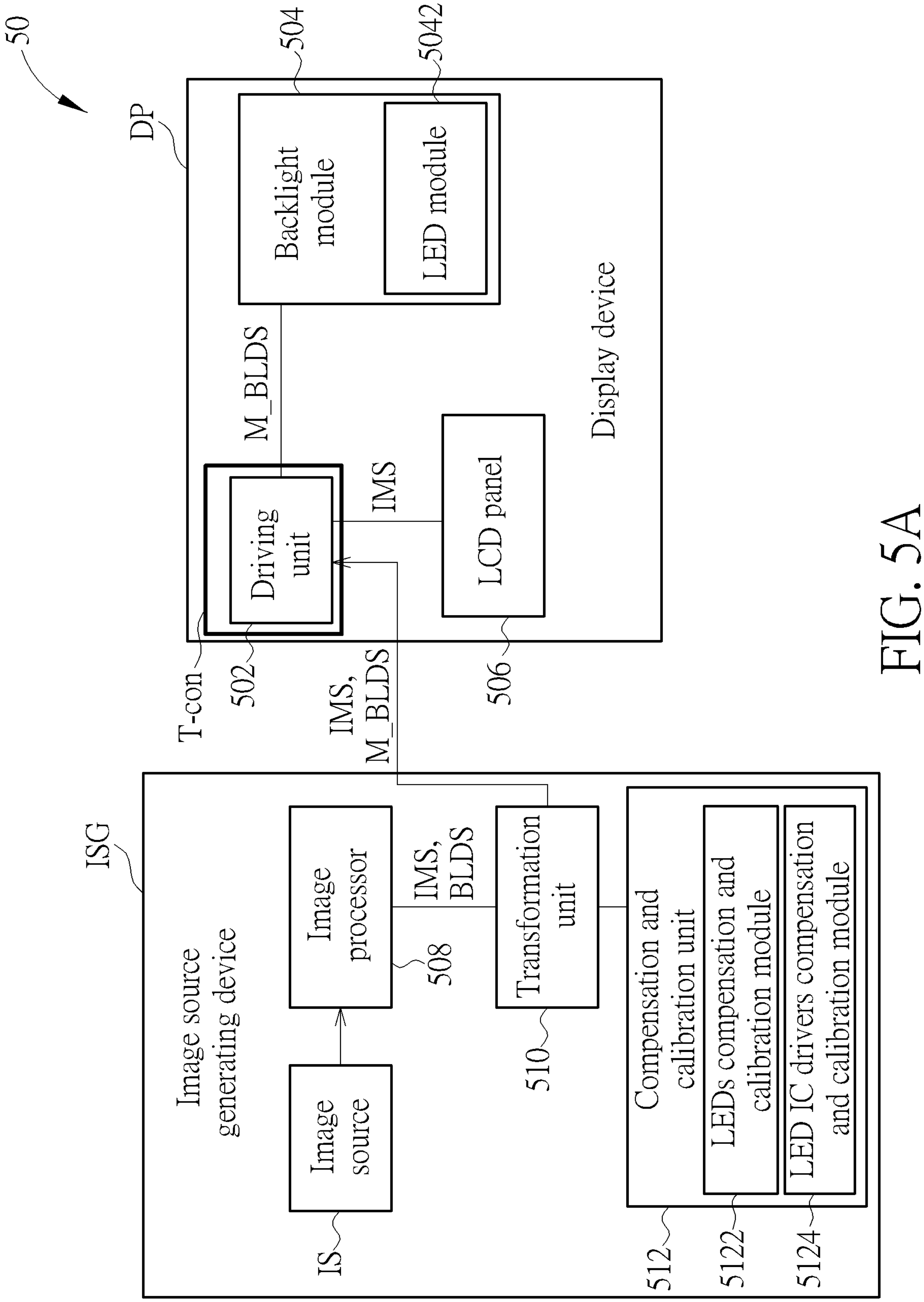

In an embodiment, the display device DP may include a timing controller T-con, wherein the timing controller T-con may include the driving unit 502. The transformation unit 510 and the compensation and calibration unit 512 are independent of the timing controller T-con (as shown in FIG. 5A), therefore, the transformation unit 510 and the compensation and calibration unit 512 are configured to perform their functions individually, and a computer device with high performance computing may be adopted as the image source generating device ISG, e.g. a graphic processing unit (GPU) may be utilized for performing the compensation and calibration functions of the transformation unit 510 and the compensation and calibration unit 512. In this way, redesign and redevelopment of the timing controller of the display device DP is not necessary, such that the image source generating device ISG may be applied in different types of display device DP and reduce development costs of the timing controller.

The image processor 508 of the image source generating device ISG is configured to output an image signal IMS and a backlight driving signal BLDS to the transformation unit

510 according to an image source IS. The compensation and calibration unit 512 is coupled to the transformation unit 510, such that the transformation unit 510 may transform the backlight driving signal BLDS into multiple modulated backlight driving signals M_BLDS according to the compensation and calibration unit 512.

The driving unit 502 of the display device DP is coupled to the LCD panel 506 and the backlight module 504, and is configured to respectively transmit the image signal IMS and the multiple modulated backlight driving signals M_BLDS to the LCD panel 506 and the backlight module 504. That is, the driving unit 502 receives the image signal IMS and the multiple modulated backlight driving signals M_BLDS from the transformation unit 510, and the driving unit 502 forwards the image signal IMS and the multiple modulated backlight driving signals M_BLDS to the backlight module 504 and the LCD panel 506. Therefore, the image signal IMS is configured to drive the LCD panel 506 to generate corresponding images, and the multiple modulated backlight driving signals M_BLDS is configured to drive the lighting zones corresponding to the LED module 5042. The backlight module 504 includes an LED module 5042, wherein the LED module 5042 includes a plurality of lighting zones corresponding to a display zone of the LCD panel 506. The backlight driving signal M_BLDS outputted by the driving unit 502 may be utilized for driving the lighting zones corresponding to the LED module 5042 of the backlight module 504.

In the above embodiments, since the compensation and calibration unit 512 according to an embodiment of the present invention may adjust the backlight driving signal BLDS for driving the LED module 5042 according to optics, circuits and element characteristics of the display system 50 to generate the multiple modulated backlight driving signals M_BLDS. Therefore, the display system 50 according to an embodiment of the present invention may improve the issue of non-uniform characteristics in the brightness of the display zone.

Moreover, the compensation and calibration unit 512 of the image source generating device ISG of the display system 50 may include a LEDs compensation and calibration module 5122 for storing the lighting adjustment information of non-uniform characteristics of the LED of the LED module 5042, such that the transformation unit 510 may transform the backlight driving signal BLDS into the multiple modulated backlight driving signals M_BLDS according to the LEDs compensation and calibration module 5122 of the compensation and calibration unit 512, and the multiple modulated backlight driving signals M_BLDS is transmitted to the driving unit 502 for driving the LED module 5042.

More specifically, since differences of manufacturing process, hardware element or circuit layout of each LED of the LED module 5042 exist, a drift of characteristics of each LED is generated, the brightness of each LED would be different when each LED of the LED module 5042 is driven by identical current, which affects a brightness uniformity of the backlight module 504. In an embodiment, the transformation unit 510 may adjust a current value of each LED according to the LEDs compensation and calibration module 5122 to avoid the non-uniform characteristics of the lighting zones in brightness.

Figure 6:
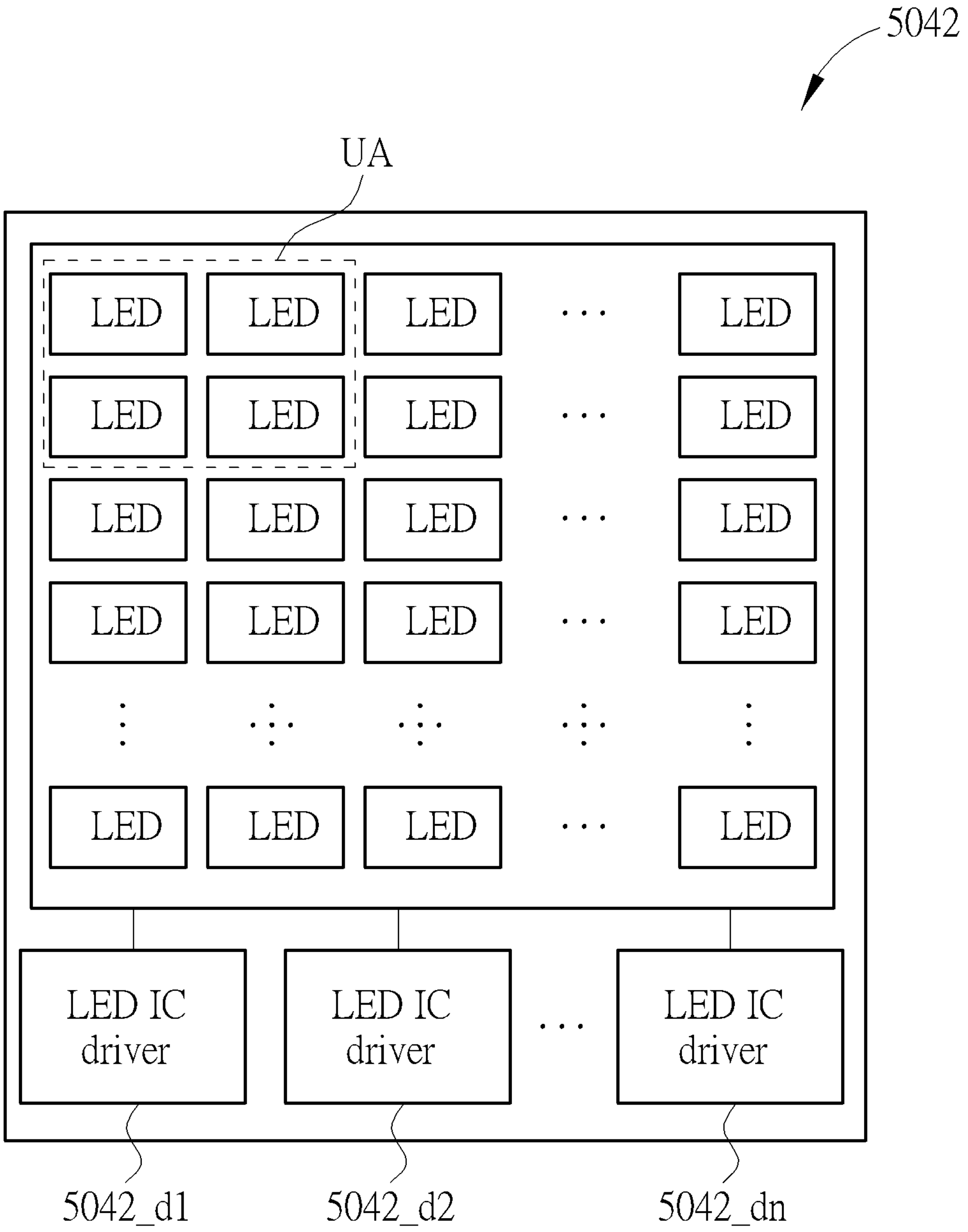
FIG. 6 is a schematic diagram of an LED module of the display device in FIG. 5 according to an embodiment of the present invention.

In addition, as shown in FIG. 6, the LED module 5042 may further include a plurality of LED IC drivers 5042_*d*1-5042_*dn* for driving the LEDs within corresponding lighting zones. In such a condition, since differences of manufacturing process, hardware element or circuit layout of the LED IC drivers 5042_*d*1-5042_*dn* exist, a drift of characteristics is generated, the compensation and calibration unit 512 of the illumination device 50 may further include a LED IC drivers compensation and calibration module 5124 for storing the driving adjustment information of non-uniform characteristics of the LED IC drivers 5042_*d*1-5042_*dn* of the LED module 5042. Therefore, the transformation unit 510 according to an embodiment of the present invention may adjust current values of the LED IC drivers 5042_*d*1-5042_*dn* according to the LED IC drivers compensation and calibration module 5124 to avoid the non-uniform characteristics of the lighting zones in brightness.

In summary, the present invention provides a light module driving method, illumination device, display device and display system. Since an output current of each lighting zone would be slightly different due to corresponding calibration of a compensation and calibration unit, and a brightness uniformity may be achieved. The present invention may improve the issue of phenomenon of non-uniform brightness of each lighting zone of the prior art when the light zones are with identical current flowing by. Meanwhile, a conventional local dimming technique may be adopted to ensure that each lighting zone after the local dimming can achieve expected zone brightness. In detail, according to a LEDs compensation and calibration module and a LED IC drivers compensation and calibration module of the compensation and calibration unit, lighting adjustment information of non-uniform characteristics of the LED and driving adjustment information of non-uniform characteristics of the LED IC drivers can be obtained to adjust current values of LEDs and LED IC drivers to avoid non-uniform characteristics of the lighting zones in brightness.

Those skilled in the art will readily observe that numerous modifications and alterations of the device and method may be made while retaining the teachings of the invention. Accordingly, the above disclosure should be construed as limited only by the metes and bounds of the appended claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light module driving method for an illumination device, the light module driving method comprising:

in an outputting operation, outputting a light driving signal according to a source;

in a transforming operation, transforming the light driving signal into a plurality of modulated light driving signals according to a compensation and calibration unit; and in a driving operation, driving a plurality of lighting zones corresponding to a light-emitting diode (LED) module of the light module according to the plurality of modulated light driving signals, wherein the LED module further includes a plurality of LED integrated circuit (IC) drivers, the plurality of LED IC drivers are configured to drive the LEDs within corresponding lighting zone, and the compensation and calibration unit includes an LED IC drivers compensation and calibration module, and wherein the LED IC drivers compensation and calibration module is configured to determine a calculation of approximate conversion function to obtain the driving adjustment information of non-uniform characteristics of the plurality of LED IC drivers of the LED module.

2. The light module driving method of claim 1, wherein the LED module includes a plurality of LEDs, and the compensation and calibration unit includes an LEDs compensation and calibration module for storing lighting adjustment information of non-uniform characteristics of the plurality of LEDs of the LED module.

3. The light module driving method of claim 2, wherein the transforming operation is configured to transform the light driving signal into the plurality of modulated light driving signals according to the LEDs compensation and calibration module of the compensation and calibration unit.

4. The light module driving method of claim 2, wherein the compensation and calibration unit includes the LED IC drivers compensation and calibration module for storing driving adjustment information of non-uniform characteristics of the plurality of LED IC drivers of the LED module, the transforming operation is configured to incorporate with the LEDs compensation and calibration module and the LED IC drivers compensation and calibration module of the compensation and calibration unit to transform the light driving signal into the plurality of modulated light driving signals.

5. The light module driving method of claim 1, wherein the illumination device is a display device, the light module is a backlight module, the source is an image source, the light driving signal is a backlight driving signal, and the driving operation is configured to output an image signal and the backlight driving signal according to the image source, and wherein the image signal is for driving the display device to generate corresponding image, and the backlight driving signal is for driving the plurality of lighting zones corresponding to the LED module of the backlight module.

6. The light module driving method of claim 5, wherein the compensation and calibration unit is independent of a timing controller of the display device.

7. The light module driving method of claim 5, wherein a timing controller of the display device includes the compensation and calibration unit.

8. The light module driving method of claim 1, wherein the illumination device is a display system having a display device and an image source generating device, the light module is a backlight module, the source is an image source, the light driving signal is a backlight driving signal, and the driving operation is configured to output an image signal and the backlight driving signal according to the image source, and wherein the image signal is for driving the display device to generate corresponding image, and the backlight driving signal is for driving the plurality of lighting zones corresponding to the LED module of the backlight module.

9. The light module driving method of claim 8, wherein the compensation and calibration unit is independent of a timing controller of the display device.

10. The light module driving method of claim 8, wherein a timing controller of the display device includes the compensation and calibration unit.

11. The light module driving method of claim 1, wherein the illumination device is a lighting device, and the source is a physical power switch or a software on/off signal for turning on/off the lighting device.

12. A light module driving method for an illumination device, the light module driving method comprising:

in an outputting operation, outputting a light driving signal according to a source;

in a transforming operation, transforming the light driving signal into a plurality of modulated light driving signals according to a compensation and calibration unit; and in a driving operation, driving a plurality of lighting zones corresponding to a light-emitting diode (LED) module of the light module according to the plurality of modulated light driving signals, wherein the LED module further includes a plurality of LED integrated circuit (IC) drivers, the plurality of LED IC drivers are configured to drive the LEDs within corresponding lighting zone, and the compensation and calibration unit includes an LED IC drivers compensation and calibration module, and wherein the LED IC drivers compensation and calibration module is configured to operate one of a first step and a second step, the first step is to store driving adjustment information of non-uniform characteristics of the plurality of LED IC drivers of the LED module, and the second step is to determine a calculation of approximate conversion function to obtain the driving adjustment information of non-uniform characteristics of the plurality of LED IC drivers of the LED module.

13. The light module driving method of claim 12, wherein the LED module includes a plurality of LEDs, and the compensation and calibration unit includes an LEDs compensation and calibration module for storing lighting adjustment information of non-uniform characteristics of the plurality of LEDs of the LED module.

14. The light module driving method of claim 13, wherein the transforming operation is configured to transform the light driving signal into the plurality of modulated light driving signals according to the LEDs compensation and calibration module of the compensation and calibration unit.

15. The light module driving method of claim 13, wherein the transforming operation is configured to incorporate with the LEDs compensation and calibration module and the LED IC drivers compensation and calibration module of the compensation and calibration unit to transform the light driving signal into the plurality of modulated light driving signals.

16. The light module driving method of claim 12, wherein the illumination device is a display device, the light module is a backlight module, the source is an image source, the light driving signal is a backlight driving signal, and the driving operation is configured to output an image signal and the backlight driving signal according to the image source, and wherein the image signal is for driving the display device to generate corresponding image, and the backlight driving signal is for driving the plurality of lighting zones corresponding to the LED module of the backlight module.

17. The light module driving method of claim 16, wherein the compensation and calibration unit is independent of a timing controller of the display device.

18. The light module driving method of claim 16, wherein a timing controller of the display device includes the compensation and calibration unit.

19. The light module driving method of claim 12, wherein the illumination device is a display system having a display device and an image source generating device, the light module is a backlight module, the source is an image source, the light driving signal is a backlight driving signal, and the driving operation is configured to output an image signal and the backlight driving signal according to the image source, and wherein the image signal is for driving the display device to generate corresponding image, and the backlight driving signal is for driving the plurality of lighting zones corresponding to the LED module of the backlight module.

20. The light module driving method of claim 19, wherein the compensation and calibration unit is independent of a timing controller of the display device.

21. The light module driving method of claim 19, wherein a timing controller of the display device includes the compensation and calibration unit.

22. The light module driving method of claim 12, wherein the illumination device is a lighting device, and the source is a physical power switch or a software on/off signal for turning on/off the lighting device.

* * * * *